United States Patent
Benoit

(10) Patent No.: US 6,186,451 B1
(45) Date of Patent: *Feb. 13, 2001

(54) CABLE TIE

(75) Inventor: James C. Benoit, Needham, MA (US)

(73) Assignee: Avery Dennison Corporation, Pasadena, CA (US)

( * ) Notice: Under 35 U.S.C. 154(b), the term of this patent shall be extended for 0 days.

This patent is subject to a terminal disclaimer.

(21) Appl. No.: 09/468,163

(22) Filed: Dec. 21, 1999

Related U.S. Application Data

(63) Continuation of application No. 08/922,767, filed on Sep. 3, 1997.

(51) Int. Cl.⁷ .................................................. F16L 3/08
(52) U.S. Cl. ........................ 248/74.3; 24/16 PB; 248/73
(58) Field of Search ................................ 248/74.3, 74.1, 248/74.2, 74.4, 74.5, 73, 230.8; 24/16 PB; D8/349

(56) References Cited

U.S. PATENT DOCUMENTS

| | | | |
|---|---|---|---|
| D. 222,128 | * 10/1971 | Schwartz ............................... | D8/394 |
| 3,049,771 | * 8/1962 | Litwin et al. ........................ | 24/16 PB |
| 3,149,808 | * 9/1964 | Weckesser ........................... | 248/74.3 |
| 3,302,913 | * 2/1967 | Collyer et al. ...................... | 248/73 |
| 4,705,245 | * 11/1987 | Osada ................................. | 248/74.3 |
| 4,784,358 | * 11/1988 | Kohut ................................. | 248/74.3 |
| 4,805,856 | * 2/1989 | Nicoli et al. ....................... | 248/74.3 |
| 4,866,816 | * 9/1989 | Caveney .............................. | 24/16 PB |
| 4,978,091 | * 12/1990 | Anderson et al. .................. | 248/74.3 |
| 5,112,013 | * 5/1992 | Tolbert et al. ...................... | 248/74.3 |
| 5,135,188 | * 8/1992 | Anderson et al. .................. | 248/74.3 |
| 5,505,411 | * 4/1996 | Heaton et al. ...................... | 248/70 |
| 5,803,413 | * 8/1998 | Benoit et al. ....................... | 248/73 |
| 5,911,392 | * 6/1999 | Greenslate ......................... | 248/74.3 |

* cited by examiner

Primary Examiner—Anita M. King
(74) Attorney, Agent, or Firm—Kriegsman & Kriegsman

(57) ABSTRACT

A cable tie for securing a connector to a cable of a harness, the connector having a pair of rails which together form a track therebetween. The cable tie comprises an elongated flexible strap having a first end and a second end. A locking head is integrally formed on the first end of the strap and is adapted to cooperate with the strap to form a loop 22 around the cable. The cable tie further comprises a fastener coupled to the strap which is sized and shaped to slide into the track formed in the connector. In one embodiment, the fastener of the cable tie is integrally formed on the strap. In another embodiment, the fastener of the cable tie and the strap are two separate pieces, thereby enabling the fastener to slide along the strap.

4 Claims, 5 Drawing Sheets

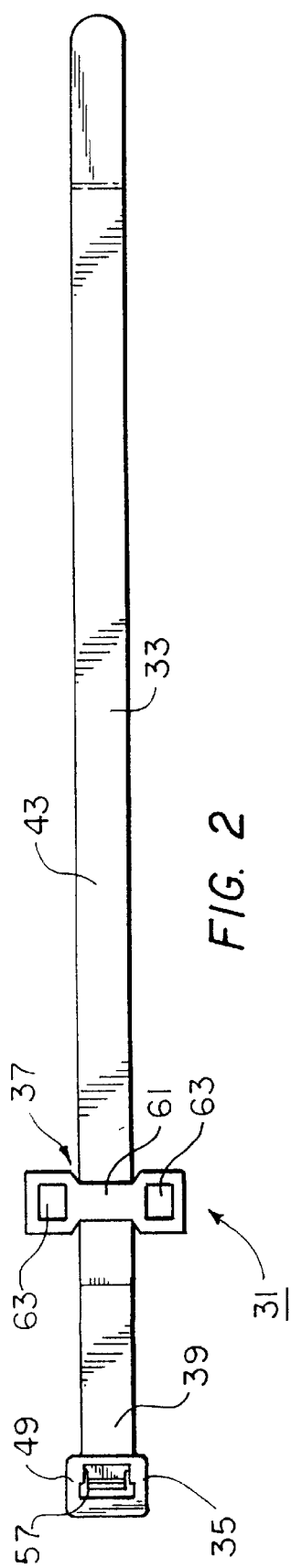
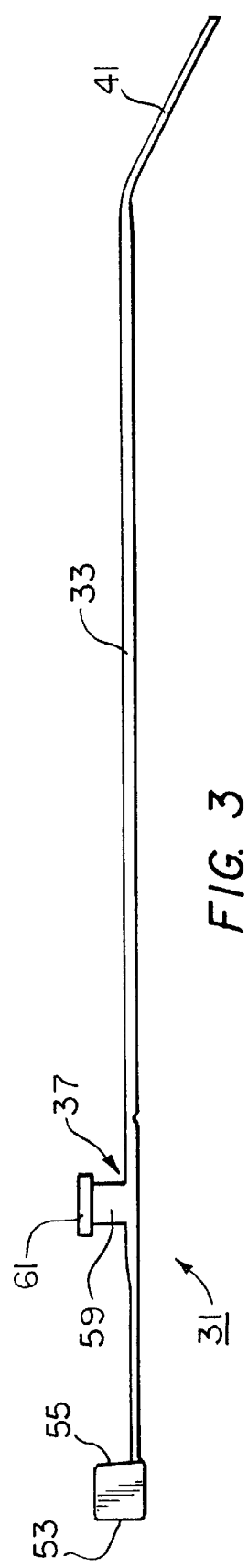
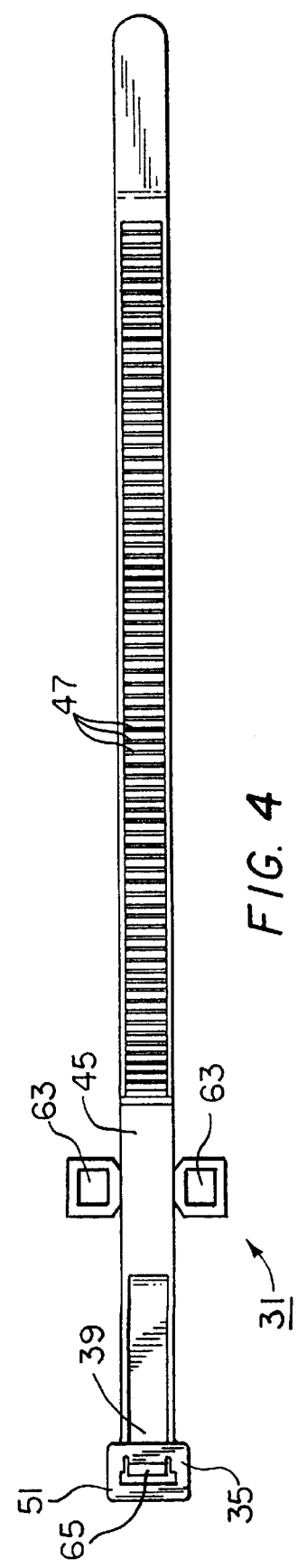

CABLE TIE

CROSS-REFERENCE TO RELATED APPLICATIONS

The present application is a continuation application of presently-pending U.S. patent application Ser. No. 08/922,767, filed Sep. 3, 1997.

BACKGROUND OF THE INVENTION

The present invention relates to cable ties.

During the preliminary stages of constructing an automobile, an automotive manufacturing team determines which electrical components, or options, (i.e., radio, lighter, cruise control, etc.) are going to be installed in the automobile. Once it has been determined which automotive components are going to be included, the manufacturing team assembles a harness outside of the automobile which will enable all of the particular automotive components selected to be electrically connected to a particular power supply in the automobile (i.e., battery, generator, etc.). The harness is constructed out of a plurality of interconnected electrical wires which are bundled together in a certain configuration to form a plurality of cables, the cables being commonly covered with a sheath of convoluted tubing. The harness is arranged into a configuration that enables the harness to fit within the automobile and that enables each automotive component be electrically connected to its associated power source.

The exact configuration of the wires of the harness are maintained by wrapping a plurality of harnessing devices around the harness at various locations.

Harnessing devices, such as cable ties, are well known in the art and commonly comprise an elongated strip of material, such as plastic, having a head at one end, a tail at the other end and either teeth or rungs disposed along the length of the strip. Feeding the tail of the tie through the head results in the tie taking the shape of a loop with the tail engaging and being locked in position by a pawl inside the head, the tail being incapable of removal once it is inserted in the head.

As an example of one type of cable tie, in U.S. Pat. No. 4,183,119 to J. H. Stewart et al, there is disclosed a harnessing device formed by a locking head and an attached serrated strap with gripper rails. The head contains a guide channel for receiving the strap after encirclement of the items to be harnessed, and an internal locking tang. The serrated strap has side rails which are proportioned to grip the encircled items. The desired gripping action is facilitated by the inclusion of serrations on the rails.

As an example of another type of cable tie, in U.S. Pat. No. 4,658,478 to J. R. Paradis there is disclosed a harnessing device for the bundling of objects which includes a locking head and a strap with teeth that are controlled by stretching. The locking head contains a pawl or tang that engages the teeth of the strap by wedging. A wedging tooth is desirably on the locking tang as well, and a further tooth to promote locking is desirably included in the locking head. The strap is advantageously molded of stretch reorientable material which is subsequently stretched to control the profile of the teeth which are engaged by the locking tang and head.

Typically, an automotive harness also comprises a plurality of automotive connectors which are electrically connected to particular wires in the harness. The automotive connectors serve to provide a means of connecting the harness to a particular automotive component or power source. Specifically, each automotive connector is sized and shaped to be matingly engageable with the electrical connector of the particular automotive component or power source. The connector often also includes a pair of rails or tracks into which can be slidably mounted the base portion of a fastener for attaching the connector to the firewall of the vehicle.

Once the harness has been manufactured in its proper configuration, the entire harness is positioned within the automobile. Once positioned within the automobile, the individual automotive connectors of the harness are connected to the connector of its associated automotive component or power source.

However, one drawback of the aforementioned manufacturing process is that if one electrical connector is mistakingly omitted from the harness or if there is a subsequent change in the selection of which automotive components are to be contained within the automobile, a proper electrical connection can not be made. As a result, the entire harness will have to be removed from the automobile for replacement, regardless of the amount of time and cost having been spent.

As a consequence, it is well known in the art for universal harnesses to be used in the manufacturing of automobiles. A universal harness is a harness which is configured to include an automotive connector for every potential automotive component which can be installed in an automobile. In this manner, the automobile is capable of having any automotive component installed without ever having to replace the particular harness.

However, it has been often found that automobiles which have a universal harness installed therein will include numerous automotive connectors which are not selected to be used to supply a particular automotive component power. As a result, many of the connectors remain unattached within the automobile. Leaving connectors, particularly the larger connectors, unattached within the automobile can cause the connectors to bounce within the automobile. This condition not only creates a significant safety hazard but also increases the noise level of the automobile, which is undesirable.

In response to the bouncing of the unattached connectors, it is well known in the automotive industry to fold the free connectors back against a cable in the harness and to wrap electrical tape to hold the connector against the cable, thereby limiting its movement.

However, the use of electrical tape to hold the unused connectors against the harness has significant drawbacks. As a first drawback, it has been found that electrical tape can be unreliable over time in holding the connector against the harness. As a result, if the tape breaks or loses its adhesiveness, the automotive connector will be free to bounce within the automobile. As a second drawback, after the automobile has been fully manufactured, a car owner may subsequently decide to install a particular component within the automobile. However, it has been found that cutting the electrical tape to free the necessary connector is often difficult to accomplish. Furthermore, it has been found that if the electrical tape is successfully cut, some of the adhesives of the tape may remain on the harness, which is undesirable.

SUMMARY OF THE INVENTION

It is an object of this invention to provide a new and improved cable tie.

It is another object of this invention to provide a cable tie as described above which provides for the secure bundling of objects.

It is yet another object of this invention to provide a cable tie as described above which has a minimum number of parts, is simple in construction and is easy to use.

Accordingly, there is provided a cable tie for securing a connector to a cable of a harness, the connector having a pair of rails which together form a track therebetween, said cable tie comprising an elongated flexible strap having a first end and a second end, a locking head integrally formed on the first end of said strap, said locking head being adapted to cooperate with said strap to form a loop around the cable, and a fastener coupled to said strap, said fastener being sized and shaped to engage the track formed in the connector.

Various other features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIG. 2 is a top view of a first embodiment of a cable tie constructed according to the teachings of the present invention;

FIG. 3 is a side view of the cable tie shown in FIG. 2;

FIG. 4 is a bottom view of the cable tie shown in FIG. 2;

DETAILED DESCRIPTION OF THE PREFERRED EMBODIMENT

Figure 1:
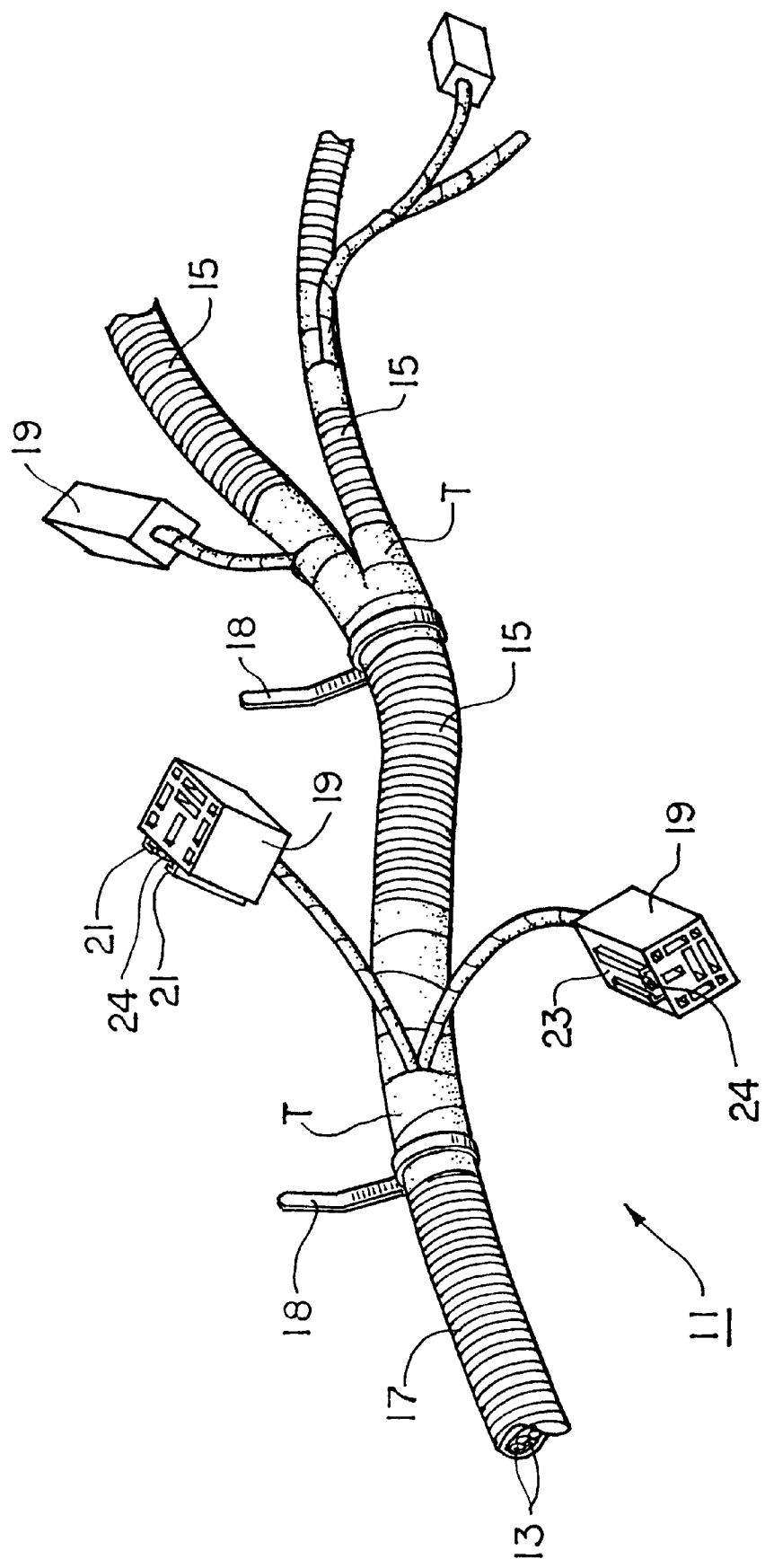
FIG. 1 is a perspective view, broken away in part, of a prior art automotive harness.
Figure 5:
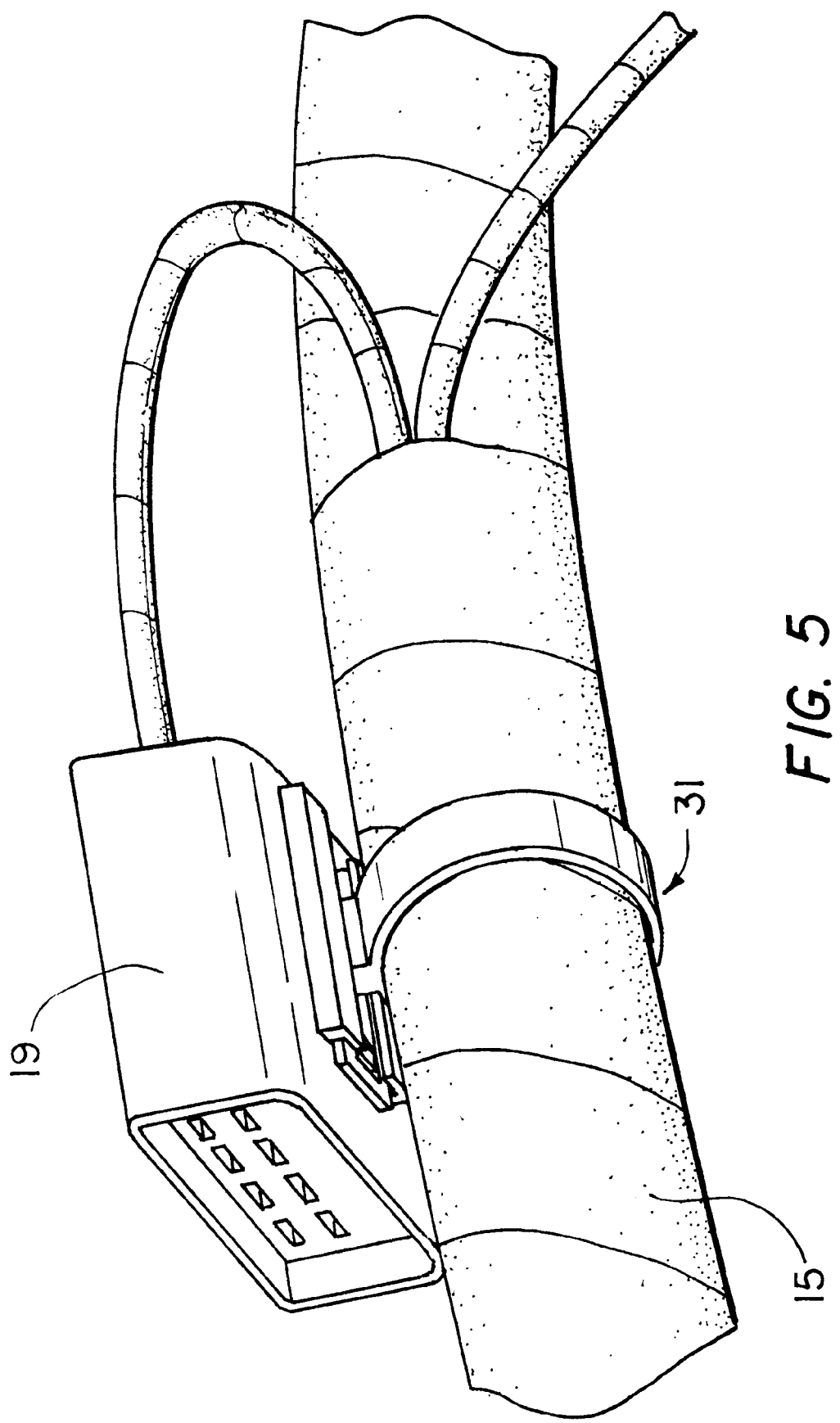
FIG. 5 is an enlarged, top perspective view of the cable tie shown in FIG. 2, the cable tie being shown securing a connector to a cable of an automotive harness, the cable being shown broken away in part.
Figure 6:
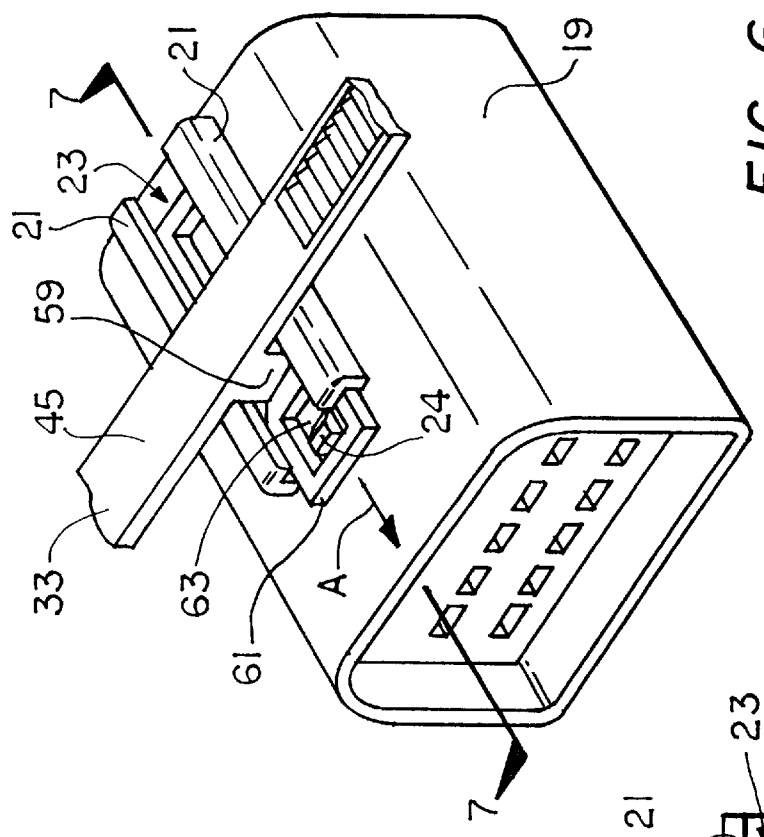
FIG. 6 is an enlarged bottom perspective view of the cable tie and connector shown in FIG. 5, the cable tie being shown broken away in part.
Figure 7:
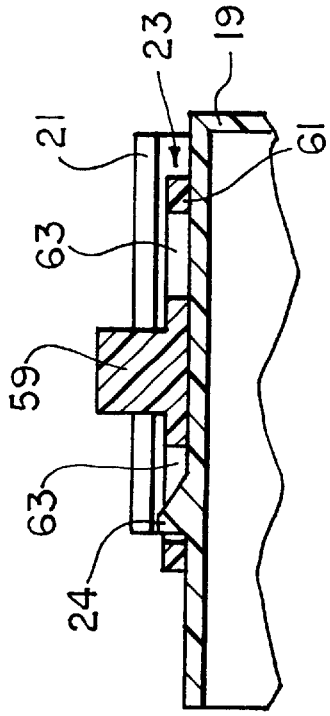
FIG. 7 is a side, section view of the cable tie and connector shown in FIG. 6, taken along lines 7—7, the connector being shown broken away in part.
Figure 11:
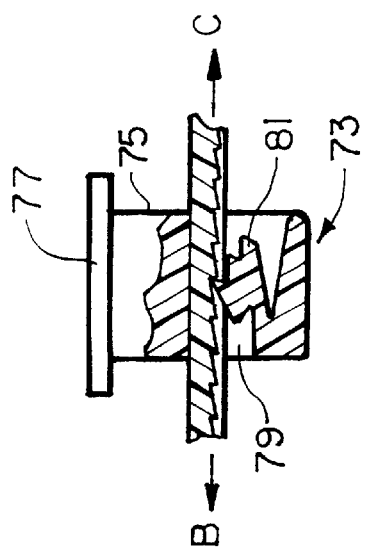
FIG. 11 is an enlarged, section view of the cable tie shown in FIG. 9, the cable tie being shown broken away in part.
Figure 8:
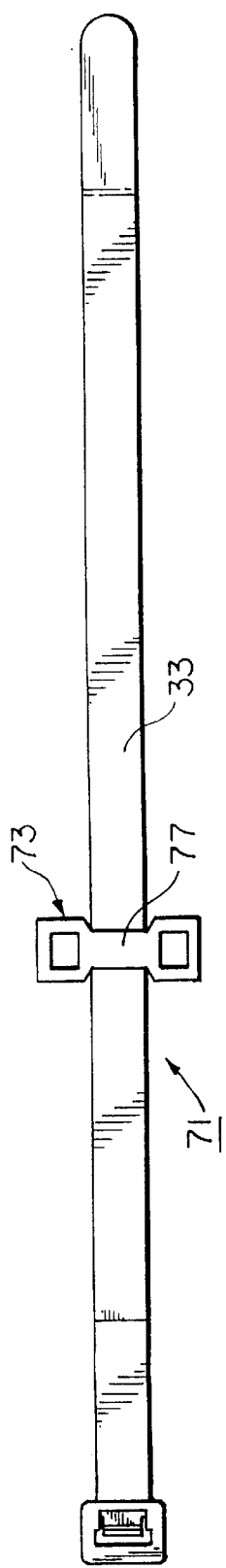
FIG. 8 is a top view of a second embodiment of a cable tie constructed according to the teachings of the present invention.
Figure 9:
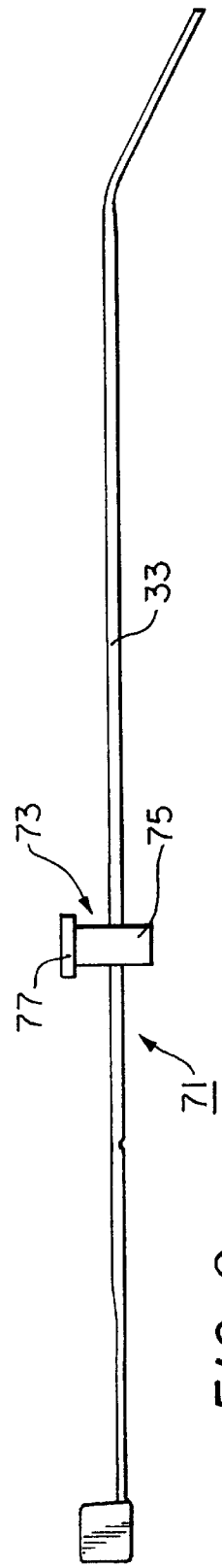
FIG. 9 is a side view of the cable tie shown in FIG. 8.
Figure 10:
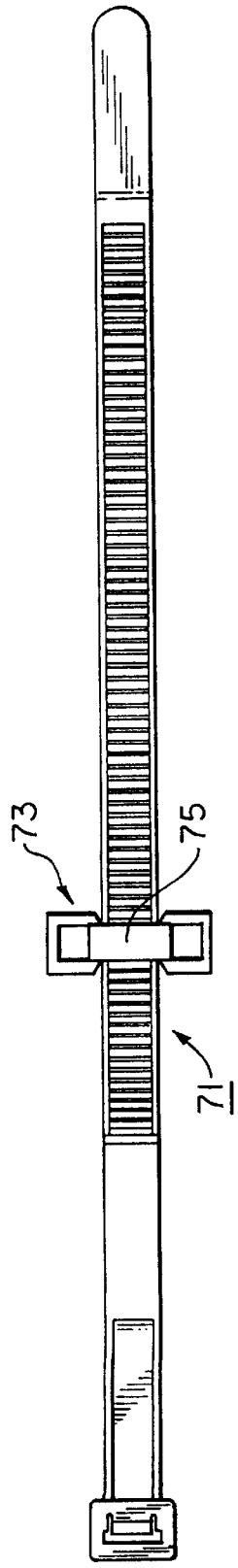
FIG. 10 is a bottom view of the cable tie shown in FIG. 8.

Referring now to FIG. 1 in the drawings, there is shown a harness 11. Harness 11 represents any well-known harness, such as a universal automotive harness, which can be used to connect electrical components (i.e., radio, lighter, headlights) to a power source (i.e., battery, motor). Harness 11 comprises a plurality of wires 13 which are bundled together so as to form a plurality of cables 15, portions of cables 15 being shown enclosed within a sheath of convoluted tubing 17.

The configuration of harness 11 can be maintained by wrapping harnessing devices 18 around cables 15 at various locations. Harnessing devices 18 may be any well known device which may be wrapped around a cable, such cable ties of the type disclosed in U.S. Pat. No. 4,183,119 to J. H. Stewart et al and U.S. Pat. No. 4,658,478 to J. R. Paradis, both of which are hereby incorporated by reference. It should be noted that portions of convoluted tubing 17 are shown with electrical tape T wrapped therearound to prevent harnessing devices 18 from sliding on tubing 17.

Harness 11 further includes a plurality of automotive connectors 19. Connectors 19 are electrically connected to selected wires 13 and are sized and shaped so as to be engageable with the connectors of particular automotive components or power sources. For example, automotive connector 19 may be sized and shaped to be engaged with the connector of a car radio to provide electrical power to the radio. Connectors 19 are well known in the art and typically include a pair of rails 21 which together define a track 23 therebetween, most types of automotive connectors 19 having a track 23 of standard size and shape. Connectors 19 also typically include a locking projection 24 which is integrally formed thereon between pair of rails 21.

Referring now to FIGS. 2–4, there is shown a first embodiment of a cable tie constructed according to the teachings of the present invention, cable 15 tie being identified by reference numeral 31.

Cable tie 31 is a one piece tie comprising an elongated strap 33, a locking head 35 and a fastener 37.

Elongated strap 33 is constructed of a flexible material such as plastic, nylon or a high modulus elastomer and includes a first end 39, a second end 41, a top surface 43 and a bottom surface 45. Strap 33 further includes a plurality of ratchet-shaped teeth 47 spaced along the length of bottom surface 45.

Locking head 35 includes a top surface 49, a bottom surface 51, an outer end wall 53, an inner end wall 55 and a strap accepting channel 57 which extends through head 35 from top surface 49 to bottom surface 51. Inner end wall 55 of locking head 35 is integrally formed on first end 39 of elongated strap 33.

Fastener 37 is integrally formed on strap 33 and comprises a neck 59 and a locking tab 61. Neck 59 is integrally formed on top surface 43 of elongated strap 33 and projects perpendicularly up from strap 33, as shown in FIG. 3. Locking tab 61 is integrally formed on the free end of neck 59 and extends perpendicularly across the longitudinal axis of strap 33, as shown in FIG. 2.

Locking tab 61 is generally bow-shaped and includes a pair of openings 63. One opening 63 is formed on each end of tab 61 so as to position each opening 63 on opposite sides of strap 33. As will be described in detail below, openings 63 serve to lock automotive connector 19 against a cable.

Tie 11 is used to bundle a cable and to secure a connector against the cable in the following manner. Second end 41 of strap 33 is wrapped around a cable 15 at a location proximate to connector 19 and is inserted through strap accepting channel 57 to form a loop. Second end 41 is further advanced through strap accepting channel 57 to reduce the size of the loop, thereby drawing strap 33 tightly around the cable. As second end 41 is fed through strap accepting channel 57, a pawl 65 within locking head 35 engages the individual ratchet teeth 47 on strap 33 to prevent extraction of strap 33 from strap accepting channel 57.

With cable tie 31 wrapped around cable 15 as described above, cable tie 31 can then be used in the following manner to secure an unattached connector 19 against the wrapped cable 15 to thereby prevent connector 19 from moving. Connector 19 is first folded back in the direction towards cable tie 31. Connector 19 is then moved so that locking tab 61 of fastener slides within the track 23 defined between rails 21 of connector 19. Connector 19 is slid within track 23 in the direction shown by arrow A until locking projection 24 extends through one of openings 63 formed in locking tab 61. With projection 24 positioned within one of openings 63, connector 19 is locked onto fastener 37 and is therefore unable to be moved away from the wrapped cable 15. As can be appreciated, because locking tab 61 includes an opening 63 at each end, connector 19 can be slid onto fastener 37 regardless of the direction in which cable tie 31 was wrapped around cable 15.

Referring now to FIGS. 8–11, there is shown a second embodiment of a cable tie constructed according to the teachings of the present invention, the cable tie being identified by reference numeral 71. Cable tie 71 differs from cable tie 31 in that cable tie 71 includes a fastener 73 which is not integrally formed to strap 33. Rather, fastener 73 comprises a guide member 75 and a locking tab 77, locking tab 77 being identical in construction and function to locking tab 61.

Guide member 75 is generally box-shaped and includes a central strap accepting channel 79. Strap accepting channel 79 is sized and shaped to permit strap 33 to be fed therethrough. It should be noted that guide member 75 is constructed so that fastener 73 may be slid only in the direction of arrow B. Specifically, fastener 73 additionally comprises a locking pawl 81 which projects into strap accepting channel 79 and which engages the individual teeth 47 on strap 33 to prevent fastener 73 from being slid in the direction of arrow C. However, it is to be noted that cable tie 71 could alternatively be constructed without pawl 81 to enable fastener 73 to slide on strap 33 in either direction.

The embodiments shown in the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A cable tie for securing an automotive connector to a cable of a harness, the automotive connector being electrically connected to at least one wire in said harness, said automotive connector having a pair of rails which together form a track therebetween, said automotive connector having a projection formed between the pair of rails, said cable tie comprising:

(a). an elongated flexible strap having a first end and a second end, (b). a locking head integrally formed on the first end of said strap, said locking head being adapted to cooperate with said strap to form a loop around the cable, and (c). a fastener coupled to said strap, said fastener comprising a locking tab and a neck, said neck projecting perpendicularly up from said strap, said locking tab being formed onto the free end of the neck and extending perpendicularly across the longitudinal axis of said strap, the locking tab including a pair of openings, one opening being formed on each end of the locking tab.

2. The cable tie of claim 1 wherein said fastener is integrally formed on said strap.

3. The cable tie of claim 1 wherein said fastener and said strap are two separate pieces.

4. The cable tie of claim 3 wherein said fastener is slidably mounted on said strap.

\* \* \* \* \*